United States Patent
Chaussade et al.

(10) Patent No.: US 10,800,137 B2
(45) Date of Patent: Oct. 13, 2020

(54) LAMINATED GLASS PANEL WITH THIN SHEET OF SHATTERPROOF GLASS

(71) Applicant: SAINT-GOBAIN GLASS FRANCE, Courbevoie (FR)

(72) Inventors: Pierre Chaussade, Orleans (FR); Stéphane Daudiffret, Orleans (FR); Benoît Lubin, Ouzouer sur Loire (FR); Michel Rouby, Bray en Val (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 306 days.

(21) Appl. No.: 15/539,924

(22) PCT Filed: Dec. 21, 2015

(86) PCT No.: PCT/FR2015/053683
§ 371 (c)(1),
(2) Date: Jun. 26, 2017

(87) PCT Pub. No.: WO2016/108005
PCT Pub. Date: Jul. 7, 2016

(65) Prior Publication Data
US 2017/0348945 A1    Dec. 7, 2017

(30) Foreign Application Priority Data
Dec. 29, 2014 (FR) .................................... 14 63375

(51) Int. Cl.
*B32B 17/10* (2006.01)
*B32B 7/02* (2019.01)

(52) U.S. Cl.
CPC .......... *B32B 7/02* (2013.01); *B32B 17/10036* (2013.01); *B32B 17/10045* (2013.01); *B32B 17/1077* (2013.01); *B32B 17/10137* (2013.01); *B32B 17/10211* (2013.01); *B32B 17/10743* (2013.01); *B32B 17/10761* (2013.01); *B32B 17/10788* (2013.01); *B32B 2605/10* (2013.01)

(58) Field of Classification Search
CPC ...... B32B 17/00–17/1099; C03C 17/00–17/44
See application file for complete search history.

(56) References Cited

U.S. PATENT DOCUMENTS

| | | | | |
|---|---|---|---|---|
| 3,357,873 A | * | 12/1967 | Rinehart | C03C 3/097 428/410 |
| 3,592,726 A | * | 7/1971 | Blizard | B32B 17/10036 428/215 |
| 3,864,204 A | * | 2/1975 | Shorr | B32B 17/10045 428/213 |
| 4,595,624 A | | 6/1986 | Greathead | |
| 2003/0124296 A1 | * | 7/2003 | Smith | B32B 17/10018 428/49 |
| 2012/0275018 A1 | * | 11/2012 | Lu | C03C 4/02 359/360 |
| 2013/0295357 A1 | * | 11/2013 | Cleary | B32B 17/10036 428/215 |
| 2014/0087159 A1 | * | 3/2014 | Cleary | B32B 17/10137 428/215 |
| 2015/0140301 A1 | * | 5/2015 | Fisher | B32B 17/10036 428/215 |

FOREIGN PATENT DOCUMENTS

| | | | | |
|---|---|---|---|---|
| CN | 200978253 Y | * | 11/2007 | ....... B32B 17/10137 |
| CN | 200978253 Y | | 11/2007 | |
| FR | 2 632 950 A1 | | 12/1989 | |
| WO | WO-2008084083 A1 | * | 7/2008 | ....... B32B 17/10917 |
| WO | WO 2013/184897 A1 | | 12/2013 | |
| WO | WO 2014/029605 A1 | | 2/2014 | |

OTHER PUBLICATIONS

Machine translation of CN200978253. Retrieved Sep. 16, 2019.*
International Search Report as issued in International Patent Application No. PCT/FR2015/053683, dated May 2, 2016.

* cited by examiner

Primary Examiner — Prashant J Khatri
(74) Attorney, Agent, or Firm — Pillsbury Winthrop Shaw Pittman LLP

(57) ABSTRACT

A laminated glazing unit includes one to ten first glass sheets each of thickness included between 1.5 and 22 mm, if needs be adhesively bonded to one another by one or more first adhesive interlayers, and a second glass sheet forming one of the two faces of the laminated glazing unit, of thickness included between 0.5 and 1.5 mm, and adhesively bonded to the first glass sheet(s) by a second adhesive interlayer, the second glass sheet being made of aluminosilicate or soda-lime glass that is chemically toughened, having a surface stress comprised between 300 and 1000 and between 200 and 500 MPa, respectively, and a depth under compression between 20 and 100 μm.

18 Claims, No Drawings

LAMINATED GLASS PANEL WITH THIN SHEET OF SHATTERPROOF GLASS

CROSS-REFERENCE TO RELATED APPLICATIONS

This application is the U.S. National Stage of PCT/FR2015/053683, filed Dec. 21, 2015, which in turn claims priority to French patent application number 1463375 filed Dec. 29, 2014. The content of these applications are incorporated herein by reference in their entireties.

The present invention relates to the splinter-protection function of glazing units, especially laminated glazing units. It is a question of the ability of a glazing unit to absorb the impact of a projectile without projecting, on the side opposite the impact, splinters that would be potentially vulnerant for nearby users.

The invention particularly relates to the front glazing units of land, air but also water transport vehicles, though also to architectural glazing units. The need for the splinter-protection functionality is greater if the speed of the glazing unit is high, as is the case for the windshields of airplanes or high-speed trains, etc.

At the present time, the splinter-protection function is achieved by the fact that the back face of the glazing unit, i.e. the face oriented on the side opposite that of the expected impact, i.e. toward the interior of the compartment or building, consists of a sheet made of polyethylene terephthalate coated with a polysiloxane anti-scratch lacquer (CPET for coated polyethylene terephthalate) or of polycarbonate (PC).

It is possible for these polymer materials to catch fire and give off relatively toxic smoke. They are therefore not qualified fire safe, but are nevertheless permitted as exempt under section 4.7 of the April 2013 version of standard EN 45545-2 until a material that is both qualified fire safe and provides protection from splinters is developed.

In addition, CPET cannot be incorporated into a laminate having a pronounced or substantial double curvature (spherical curvature).

The objective of the invention is to provide a splinter-protection solution that is qualified fire safe and compatible with a spherical curvature.

This aim is achieved by the invention, one subject of which is therefore a laminated glazing unit comprising one to ten first glass sheets each of thickness comprised between 1.5 and 22 mm, if needs be adhesively bonded to one another by one or more first adhesive interlayers, and a second glass sheet forming one of the two faces of the laminated glazing unit, of thickness comprised between 0.5 and 1.5 mm, and adhesively bonded to said first glass sheet(s) by a second adhesive interlayer, characterized in that said second glass sheet is made of aluminosilicate or soda-lime glass that is chemically toughened, having a surface stress comprised between 300 and 1000 and between 200 and 500 MPa, respectively, and a depth under compression between 20 and 100 µm in both cases.

The term "glass" is understood, in the context of the invention, to mean any type of mineral glass such as optionally chemically toughened soda-lime float glass, optionally chemically toughened aluminosilicate glass (with or without alkali metals), aluminoborosilicate glass, borosilicate glass, etc.

Said relatively thin second glass sheet is intended to form the back face of the glazing unit, i.e. the face oriented toward the interior of the compartment or building, i.e. the face opposite that liable to receive an impact. The flexural modulus of rupture of said second glass sheet has high values of the same order as those cited above for its surface stress: in case of shock, breakage of this second glass sheet is delayed. It then breaks into non-vulnerant small pieces or splinters, especially given its thinness and high core tensile stress; these small splinters remain adhesively bonded to the second adhesive interlayer. When a projectile strikes the glazing unit, it is pocketed in said second adhesive interlayer, but does not perforate it.

The thin glass is qualified fire safe, its geometry may have a spherical curvature.

According to other preferred features of the laminated glazing unit of the invention:
said adhesive interlayers are chosen from polyvinyl butyral, thermoplastic polyurethane, ethylene vinyl acetate or a resin such as an ionomer resin;
said second adhesive interlayer has a thickness comprised between 0.3 and 7, preferably at least equal to 1.25 and, in preferably increasing order, at most equal to 6 and 5 mm;
it comprises a single said first glass sheet of thickness at most equal to 12, and preferably to 10 mm, made of aluminosilicate or soda-lime or thermally tempered soda-lime glass that is chemically toughened, having a surface stress comprised between 300 and 1000 MPa for the aluminosilicate and 200 and 500 MPa for the soda-lime, respectively, and a depth under compression between 20 and 100 µm in both cases; for the thermally tempered glass, mention may be made of surface stress values at most equal to 65 MPa, for example;
it comprises at least two said first glass sheets that are made, independently of each other, either of chemically toughened or thermally tempered soda-lime glass having a surface stress comprised between 200 and 500 MPa and a depth under compression between 20 and 100 µm, or of optionally chemically toughened aluminosilicate glass having a surface stress comprised between 300 and 1000 MPa and a depth under compression between 20 and 100 µm;
it comprises at most four and preferably three said first glass sheets;
in the case where said first glass sheets are at least two in number, their thickness is at most equal to 12 mm;
said first adhesive interlayer(s) has(have) a thickness (thicknesses) comprised between 0.7 and 8 and preferably at least equal to 1 and at most equal to 7 mm; and
the face oriented toward said second glass sheet of the one at least of said two first glass sheets that are furthest from said second glass sheet bears a heating layer; one example thereof is a layer of 200 nm thickness of indium tin oxide (or even tin-doped indium oxide or ITO), which is a mixed oxide or a mixture obtained from oxides of indium (III) ($In_2O_3$) and tin (IV) ($SnO_2$), preferably in proportions by weight comprised between 70 and 95% for the first oxide and 5 to 20% for the second oxide; a typical proportion by weight is about 90 wt % $In_2O_3$ for about 10 wt % $SnO_2$.

Other subjects of the invention consist of:
the application of a laminated glazing unit such as described above to not projecting vulnerant splinters on the second-glass-sheet side in case of an impact on that side of the laminated glazing unit which is opposite thereto;
the application of this laminated glazing unit to not producing smoke on the second-glass-sheet side in case of a fire on that side of the laminated glazing unit;

such an application as a water, air or land transport vehicle glazing unit, the face of which formed from said second glass sheet is the face that is oriented toward the interior of the vehicle, especially as an aeronautical glazing unit or a train windshield; and such an application as an architectural glazing unit, the face of which formed from said second glass sheet is the face that is oriented toward the interior of the building.

The invention will be better understood in light of the following examples.

EXAMPLE 1

A laminated glazing unit is formed from a sheet of soda-lime-silica float glass that is chemically toughened in the sense defined above (i.e. having a surface stress comprised between 200 and 500 MPa and a depth under compression between 20 and 100 µm) of 3 mm thickness and from another sheet of the same chemically toughened material but of 0.8 mm thickness, which sheets are adhesively bonded to each other by a 2 to 5 mm-thick layer of polyvinyl butyral (PVB) or thermoplastic polyurethane (TPU).

That face of the 3 mm-thick chemically toughened glass sheet which is oriented toward the other glass sheet is coated with a 200 nm-thick layer of indium tin oxide (ITO).

An impact on that face of the glazing unit which is formed from the thickest glass sheet does not produce vulnerant splinters on the side of the other face of the glazing unit. The products of the breakage of the thin glass sheet remain adhesively bonded to the adhesive interlayer.

EXAMPLE 2

In the following examples the following abbreviations will be used:

RC: soda-lime-silica float glass (or optionally aluminosilicate glass for thicknesses at most equal to 3 mm) that is chemically toughened in the sense defined above (especially two different surface stress domains in the two cases);

V: soda-lime-silica float glass that is not chemically toughened and optionally thermally tempered, or aluminosilicate glass that is not chemically toughened for thicknesses at most equal to 3 mm;

PU: polyurethane; and

PVB: polyvinyl butyral.

The following laminated glazing unit was assembled; the thickness of the constituents thereof is indicated below in millimeters:

6RC/5PU/3RC/2.8PU/0.8RC

In this example and in the following ones, a UIC projectile according to standard EN 15152:2007 (F) was fired horizontally at a specified speed at the glazing unit, which was inclined at a specified angle to the horizontal.

In this example, the maximum speed of the train was lower than or equal to 160 km/h and the glazing unit was inclined at 75° to the horizontal.

EXAMPLE 3

The composition of the laminated glazing unit was:
6RC/1.14PVB/3RC/4.56PU/3RC/3.3PU/0.8RC The maximum speed of the train was above 160 km/h and lower than or equal to 300 km/h and the glazing unit was inclined at 40° to the horizontal.

EXAMPLE 4

The composition of the laminated glazing unit was:
8RC/1.9PVB/6V/1.52PVB/6RC/2PU/0.8RC The maximum speed of the train was above 300 km/h and the glazing unit was inclined at 30° to the horizontal.

In examples 2 to 4 the adhesive interlayer adhesively bonding the thin glass was observed to pocket the projectile, which did not perforate it. The splinters of the thin glass sheet remained adhered to this adhesive interlayer (PU). No vulnerant glass splinters originating from breakage of the 0.8 mm-thick sheet were projected.

The 0.8 mm-thick glass sheet may be given a complex shape and especially a double (spherical) curvature. Its material is qualified fire safe, in contrast to organic polymer materials.

The invention claimed is:

1. A laminated glazing unit comprising one to ten first glass sheets each having a thickness between 1.5 and 22 mm, if needs be adhesively bonded to one another by one or more first adhesive interlayers, and a second glass sheet forming one of the two faces of the laminated glazing unit, having a thickness between 0.5 and 1.5 mm, and adhesively bonded to said first glass sheet(s) by a second adhesive interlayer, wherein said second glass sheet is made of chemically toughened aluminosilicate or chemically toughened soda-lime glass, the chemically toughened aluminosilicate having a surface stress between 300 and 1000 MPa and a depth under compression between 20 and 100 µm; and the chemically toughened soda-lime glass having a surface stress between 200 and 500 MPa and a depth under compression between 20 and 100 µm, wherein said second adhesive interlayer has a thickness between 2.5 mm and 7 mm and is selected from the group consisting of polyvinyl butyral, thermoplastic polyurethane, and ethylene vinyl acetate, wherein one of said first glass sheet(s) forms the other one of the two faces of the laminated glazing and wherein each of said one or more first adhesive interlayers is selected from the group consisting of polyvinyl butyral, thermoplastic polyurethane, ethylene vinyl acetate and an ionomer resin.

2. The laminated glazing unit as claimed in claim 1, comprising a single said first glass sheet having a thickness at most equal to 12 mm made of thermally tempered soda-lime glass, or made of soda-lime glass that is chemically toughened, or made of aluminosilicate that is chemically toughened, said single first glass sheet made of aluminosilicate that is chemically toughened having a surface stress comprised between 300 and 1000 MPa and a depth under compression between 20 and 100 µm, and said single first glass sheet made of soda-lime that is chemically toughened having a surface stress between 200 and 500 MPa and a depth under compression between 20 and 100 µm.

3. The laminated glazing unit as claimed in claim 1, comprising at least two said first glass sheets that are made independently of each other, said at least two said first glass sheets being made of chemically toughened or thermally tempered soda-lime glass having a surface stress comprised between 200 and 500 MPa and a depth under compression between 20 and 100 µm, or said at least two said first glass sheets being made of chemically toughened aluminosilicate glass having a surface stress between 300 and 1000 MPa and a depth under compression between 20 and 100 µm.

4. The laminated glazing unit as claimed in claim 3, comprising at most four said first glass sheets.

5. The laminated glazing unit as claimed in claim 3, wherein the thickness of said first glass sheets is at most equal to 12 mm.

6. The laminated glazing unit as claimed in claim 3, wherein said first adhesive interlayer(s) has(have) a thickness (thicknesses) between 0.7 and 8 mm.

7. The laminated glazing unit as claimed in claim 1, wherein a face oriented toward said second glass sheet of one at least of said two first glass sheets that are furthest from said second glass sheet bears a heating layer.

8. The laminated glazing unit as claimed in claim 1, wherein the second adhesive interlayer has a thickness at most equal to 6 mm.

9. The laminated glazing unit as claimed in claim 8, wherein the second adhesive interlayer has a thickness at most equal to 5 mm.

10. The laminated glazing unit as claimed in claim 2, wherein said single first glass sheet has a thickness at most equal to 10 mm.

11. The laminated glazing unit as claimed in claim 4, comprising at most three said first glass sheets.

12. The laminated glazing unit as claimed in claim 6, wherein said first adhesive interlayer(s) has(have) a thickness (thicknesses) at least equal to 1 mm and at most equal to 7 mm.

13. The laminated glazing unit as claimed in claim 1, wherein said one of the two faces is coated with an indium tin oxide layer.

14. A method comprising utilizing a laminated glazing unit as claimed in claim 1 for protection against an impact on a side of the laminated glazing unit which is opposite to the second-glass sheet so that projecting vulnerant splinters are not produced on the second-glass-sheet side during said impact.

15. A method comprising utilizing a laminated glazing unit as claimed in claim 1 for preventing the formation of smoke on a side of the second-glass sheet during a fire on that side of the laminated glazing unit.

16. The method as claimed in claim 14, wherein the laminated glazing unit is utilized as a water, air or land transport vehicle glazing unit, the face of which formed from said second glass sheet is the face that is oriented toward the interior of the vehicle.

17. The method as claimed in claim 16, wherein the laminated glazing unit is utilized as an aeronautical glazing unit or a train windshield.

18. The method as claimed in claim 14, wherein the laminated glazing unit is utilized as an architectural glazing unit, the face of which formed from said second glass sheet is the face that is oriented toward the interior of the building.

* * * * *